Nov. 10, 1959
J. E. JENNINGS
2,912,628
VACUUM ADJUSTABLE VOLTAGE DIVIDER
Filed June 22, 1956
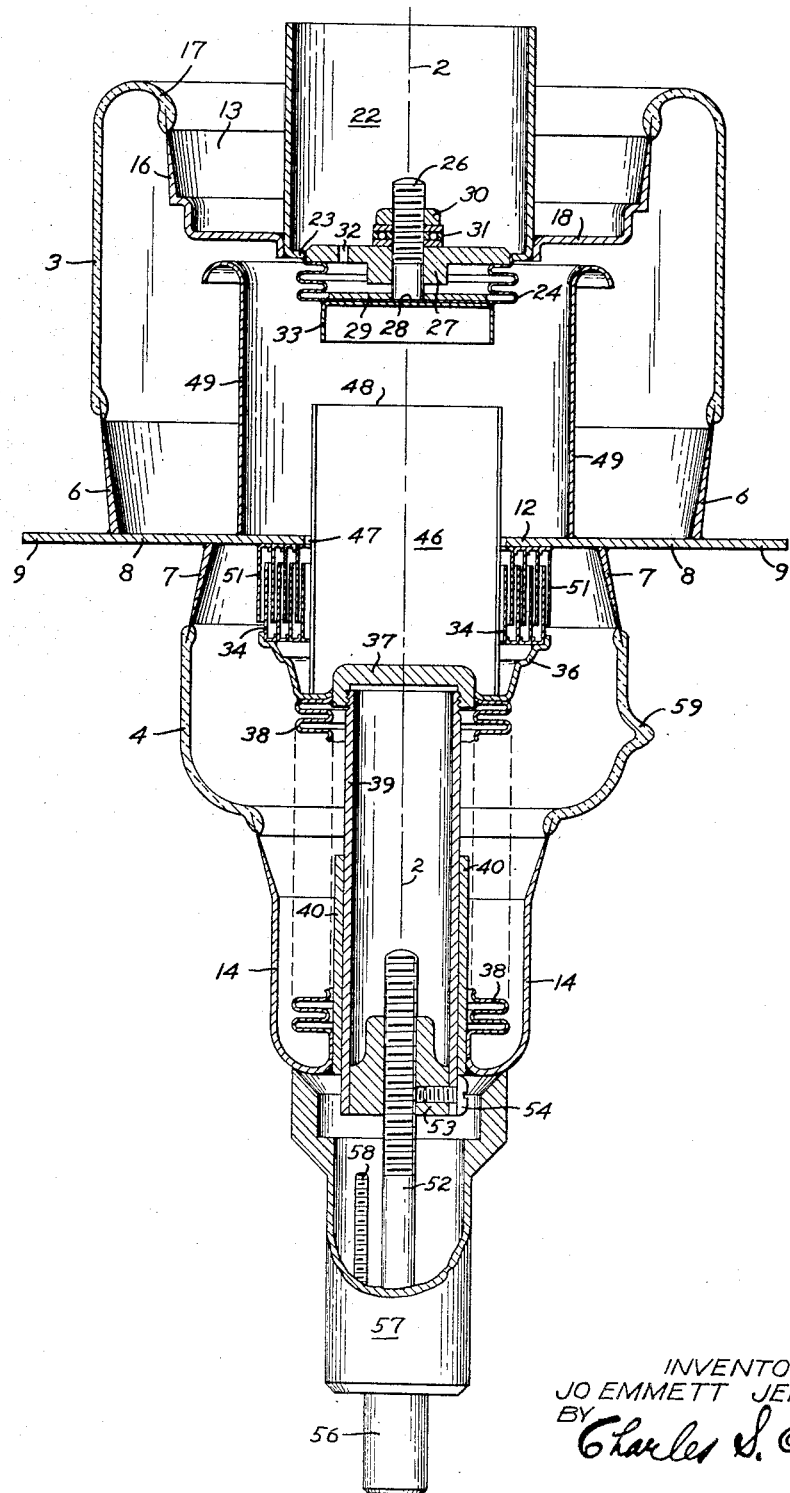
INVENTOR
JO EMMETT JENNINGS
BY
Charles S. Evans
his ATTORNEY

United States Patent Office 2,912,628
Patented Nov. 10, 1959

2,912,628

VACUUM ADJUSTABLE VOLTAGE DIVIDER

Jo Emmett Jennings, San Jose, Calif., assignor to Jennings Radio Manufacturing Corporation, San Jose, Calif., a corporation of California Application June 22, 1956, Serial No. 593,231

15 Claims. (Cl. 317—245)

My invention relates to voltage dividers; and more particularly to an adjustable voltage divider incorporating a vacuum variable capacitor.

One of the objects of the invention is the provision of a voltage divider designed to operate efficiently at the higher radio frequencies (VHF) with up to 50 and 60 amperes flowing through the implement.

Another object is the provision of a voltage divider having a high voltage input circuit characterized by extremely low inductance.

Still another object of the invention is the provision of a voltage divider incorporating means for varying the ratio into which a voltage is to be divided.

Another object is the provision of a voltage divider adjustable to permit the measurement of several ranges of voltages.

Another object of my invention is the provision of a voltage divider in which the low voltage probe is shielded internally by means connected to the grounded mounting flange.

Still another object is the provision of a voltage divider capable of being operated in "balanced-to-ground" operation.

A still further object is the provision of a voltage divider utilizing two dividing capacitors of coaxial construction enclosed in a single vacuumized envelope.

Another object is the provision of a vacuum voltage divider characterized by its simplicity of parts and inherent mechanical and electrical stability.

Still another object is the provision of a vacuum adjustable voltage divider capable of dividing continuous or pulsed voltages as high as 120 kv. peak.

A still further object is the provision of a vacuum adjustable voltage divider which may be calibrated at low frequencies and used to measure voltages at high frequencies.

My invention possesses other objects, some of which will be brought out in the following description of the invention. I do not limit myself to the showing made by the said description and the drawings, since I may adopt variant forms of the invention within the scope of the appended claims.

Referring to the drawing, the figure is a vertical half sectional view, partly in elevation, taken in the plane of the longitudinal axis of the implement. The figure is drawn approximately actual size.

My vacuum adjustable voltage divider finds useful application in the division of continuous and pulsed voltages, and has been especially designed for operation at higher frequencies such as 50 mc. and up, where current loads up to 50 and 60 amperes must be handled. Thus, the implement may be used for the measurement of radio frequency tank and transmission line voltages, viewing the output wave form of high voltage pulse generators, viewing output wave shape of high voltage aircraft magnetos, and observing the wave front of very short pulses such as the transient voltages that appear during 60 cycle current interruptions at a low power factor. Two of these implements may also be used in a balanced-to-ground arrangement to measure push-pull output and transmission line voltages as high as 120 kv. peak-to-peak.

Broadly, the implement of my invention comprises a voltage divider and a capacitor connected together in mutually responsive inductive relation, both being enclosed within a single evacuated envelope.

The envelope is conveniently formed of two coaxially arranged dielectric shells having adjacent ends hermetically sealed to a centrally positioned metallic annulus, and remote ends hermetically sealed to metallic end caps constituting terminal electrodes.

The metallic annulus provides an inwardly extending portion serving as an annular mounting plate, and an outwardly extending portion constituting an electrostatic shield or mounting flange for mounting the implement in a panel. The dielectric shell on one side of the metallic annulus is larger in diameter than the other shell and is formed with a reentrant outer end portion sealed hermetically to the outwardly opening metallic end cap, on the inner side of which is integrally mounted an expansible structure supporting the adjustable internal input electrode of the voltage divider. A metallic cylinder integrally united externally to the terminal end cap serves to electrically connect the adjustable input electrode to a source of radio frequency voltage.

Within the large diameter envelope shell the input electrode is coaxially and inductively related to the free end of a central cylindrical conductor or electrode, the other end of which is integrally united to a mobile assembly of condenser plates. The mobile condenser plates are positioned on the opposite side of the electrostatic shield from the input electrode. An expansible structure including a bellows hermetically seals the mobile assembly in integral conductive relation with the associated metallic terminal end cap. The expansible structure serves to adjustably mount the mobile assembly of condenser plates with relation to an interleaved fixed condenser plate assembly integrally mounted on the inwardly extending annular mounting plate.

The ratio of voltage division in an implement of this type occurs inversely as the ratio of capacities. Therefore, adjustment of the mobile assembly of condenser plates to vary its capacitive relation to the assembly of fixed plates, also varies the inductive relation between the mobile center conductor or probe and the high voltage input electrode, thus proportionately varying the output voltage. Since the input electrode is separately adjustable on its own expansible structure, the inductive relationship of the center probe with the input electrode may be re-adjusted over a wide range to secure a desired ratio of voltage division. To insure accurate voltage division, an internal cylindrical metallic shield is integrally mounted on the grounded annular mounting plate so as to concentrically surround the input electrode and center conductor or probe.

In greater detail, my vacuum adjustable voltage divider is formed by an envelope concentrically disposed about a longitudinal axis 2, and comprises two dielectric envelope parts or shells 3 and 4 of glass, having coaxially aligned adjacent ends hermetically sealed to oppositely extending metallic flanges 6 and 7, respectively, integral with and extending from opposite sides of the intermediately positioned metallic annulus 8. A radially outwardly extending portion 9 of the annulus serves as an electrostatic shield between the input and output sections of the implement; and as a mounting flange for fixing the implement in a panel or to a ground conductor.

Within the envelope, a radially inwardly extending portion 12 of the annulus 8 serves as a mounting plate for internal elements of the implement, and also divides the envelope into upper and lower chambers. The upper chamber above the annulus constitutes a high voltage low inductance evacuated input section and adjustable voltage divider, and the lower chamber constitutes an efficient vacuum variable capacitor.

At their remote ends, the dielectric shells 3 and 4 are hermetically sealed to metallic terminal caps 13 and 14, respectively. The terminal cap 13 is like an outwardly opening cup having the sides 16 sealed hermetically to the reentrant edge 17 of the shell 3, and having an apertured bottom 18, in which an outwardly extending cylindrical metallic terminal shell 22 is integrally united as by brazing. The physical and geometrical values of this large diameter shell 3 reduce to a very low value the inductance of the input circuit, determined in part by the distance between the electrostatic shield 9 and the high voltage input terminal.

The input terminal shell 22 is of relatively large diameter to provide rigidity and the ability to withstand shock and vibration; and has an inturned stiffening flange 23 at its inner end in which is brazed an adjustable expansible structure including bellows 24 and actuating stem 26, slidable in a slide bearing tube 27 brazed into the open outer end of the bellows. The inner end of the stem is brazed to the inner closed end 28 of the bellows which is reenforced by plate 29. The outer end of the stem is threaded to receive a nut 30, which thrusts against the bearing assembly 31, to contract and allow expansion of the bellows, which of course, tends to full expansion under atmospheric pressure, rendered effective through a vent 32, or by leakage around the stem 26.

The bellows serves to electrically connect the terminal shell 22 to the input electrode assembly, brazed on the closed inner end of the bellows 24 within the envelope; and constituted of one or more cylindrical concentric condenser plates 33.

Movably mounted on the opposite end cap 14, is an assembly of concentric cylindrical condenser plates 34, integrally mounted on a hollow mounting shell 36, which in turn is integrally mounted on the cap 37 forming the inner closed end of an expansible structure brazed to the end cap 14, and including metallic bellows 38 and hollow stem 39, slidable in bearing tube 40 brazed to end cap 14. The outer open end of the bellows closely surrounds the bearing tube and is brazed thereto and to the associated end cap 14.

Concentrically and integrally mounted on the mounting shell 36 adjacent its union with the cap 37 is the probe or central conductor 46 extending through the central aperture 47 in the annular plate 12, and terminating in a free end 48 spaced from the input electrode assembly. This probe is of large diameter and serves as a low inductance pick-up lead to receive induced energy from the input electrode and conduct it to the mobile assembly of condenser plates 34. Stray electrical charges between the input electrode and the probe are picked up by a cylindrical shield 49 concentrically surrounding both elements and integrally united at one end to the normally grounded mounting plate 12.

On the opposite side of the plate 12, and, like shield 49, integral therewith, is an assembly of fixed concentric cylindrical condenser plates 51 interleaved with mobile plates 34. Adjustment of the mobile plates thus effects a decrease or an increase in the capacitive relation of these plates; while simultaneously effecting a proportionate decrease or increase in the space between the central conductor 46 and the input electrode assembly 33.

Adjustment of the mobile plates 34 is effected by a screw spindle 52 working in threaded plug 53, removably secured in the outer open end of the hollow slide stem 39 by screws 54. A turning head 56 working against hood 57 provides means for axially moving stem 39 to effect adjustment of the condenser plates 34 and probe 46. Inward movement of the stem 39 is limited by screw 54 abutting the outer end of the bearing tube, and outward movement of the stem is limited by a stop screw 58 extending into the hood parallel to screw spindle 52. Subsequent evacuation of the envelope through tubulation 59 in the shell 4 removes all contaminants from the interior of the envelope chambers and provides a high vacuum therein.

In use, the input terminal shell 22 is connected by a complementary cylindrical conductor carrying the high radio frequency voltage. This arrangement discourages corona radiation at this point, however, in installations where large diameter lead-in conductors are not practical, a corona shield may be mounted directly on the terminal shell.

I claim:

1. A vacuum adjustable voltage divider comprising a vacuumized envelope having ends constituting terminal electrodes, an expansible conductive support structure within each end of the envelope integrally connected to the associated terminal electrode, an assembly of mobile condenser plates mounted on each expansible structure in mutual inductive relation, an assembly of fixed condenser plates mounted in the envelope and interleaved with one of said mobile condenser plate assemblies, and means external to the envelope and operatively supported thereon for separately moving each expansible structure.

2. The combination according to claim 1, in which metallic probe means is inductively interposed between said mobile condenser plate assemblies and supported on one of them to receive and transfer an induced electrical charge from one mobile assembly to the other.

3. A vacuum adjustable voltage divider comprising a vacuumized envelope having metallic end caps constituting terminal electrodes, an expansible conductive support structure within each end of the envelope integrally mounted on the associated end cap and extending into the envelope, an assembly of fixed condenser plates mounted in the envelope, a first assembly of mobile condenser plates interleaved with said fixed plates and integrally mounted on the inner end of one of said expansible support structures, a second assembly of at least one mobile condenser plate integrally mounted on the other said expansible support structure and extending into the envelope toward said first assembly, a mobile cylindrical conductor integrally mounted for movement with said first assembly of mobile condenser plates and inductively related to said second condenser plate assembly, and means external the envelope and operatively supported thereon for separately moving each expansible structure.

4. A vacuum adjustable voltage divider comprising a vacuumized envelope having ends constituting terminal electrodes, said envelope including an annular metallic plate forming a part thereof and positioned intermediate the terminal electrodes and having a radially inwardly extending mounting portion and a radially outwardly extending shielding portion, an expansible conductive support structure within each end of the envelope integrally connected to the associated terminal electrode, an assembly of mobile condenser plates mounted on each expansible structure in mutual inductive relation, an assembly of fixed condenser plates mounted in the envelope and interleaved with one of said mobile condenser plate assemblies, and means external to the envelope and operatively supported thereon for moving each expansible structure.

5. The combination according to claim 4, in which the assembly of fixed condenser plates is integrally mounted on said radially inwardly extending mounting portion of the plate.

6. A vacuum adjustable voltage divider comprising a vacuumized envelope having metallic end caps constituting terminal electrodes, said vacuumized envelope including two dielectric shells having adjacent ends hermetically sealed to a metallic annulus constituting an electrostatic shield and their remote ends hermetically sealed to said metallic end caps, an expansible conductive support structure within each end of the envelope integrally connected to the associated terminal electrode, an assembly of mobile condenser plates mounted on each expansible structure in mutual inductive relation, an assembly of fixed condenser plates mounted in the envelope and interleaved with one of said mobile condenser plate assemblies, and means external to the envelope and operatively supported thereon for moving each expansible structure.

7. A vacuum adjustable voltage divider comprising a vacuumized envelope having ends constituting terminal electrodes, an expansible conductive support structure within each end of the envelope, each expansible structure including a metallic bellows closed at its inner end and integrally mounted at its open outer end on the associated terminal electrode to hermetically seal the envelope, an assembly of mobile condenser plates mounted on each expansible structure in mutual inductive relation, an assembly of fixed condenser plates mounted in the envelope and interleaved with one of said mobile condenser plate assemblies, and means external to the envelope and operatively supported thereon for moving each expansible structure.

8. The combination according to claim 7, in which a mobile condenser plate assembly is integrally mounted on the inner end of each bellows.

9. The combination according to claim 7, in which each said means for moving each expansible structure includes a slide bearing tube integrally mounted on a terminal electrode and extending into the associated bellows, a stem slidable on the slide bearing tube and integrally connected to the closed inner end of the bellows, and a screw spindle interposed between the stem and the associated terminal electrode to effect movement of the stem.

10. A vacuum adjustable voltage divider comprising a vacuumized envelope having ends constituting terminal electrodes, an expansible conductive support structure within each end of the envelope integrally connected to the associated terminal electrode, an assembly of mobile condenser plates mounted on each expansible structure in mutual inductive relation, a cylindrical metallic conductor inductively interposed between said mobile condenser plate assemblies and having one end integrally mounted on one mobile plate assembly and the other end spaced from the other mobile plate assembly in position to receive an induced charge therefrom, an assembly of fixed condenser plates mounted in the envelope and interleaved with one of said mobile condenser plate assemblies, and means external to the envelope and operatively supported thereon for moving each expansible structure.

11. A vacuum adjustable voltage divider comprising a vacuumized envelope having metallic end caps constituting terminal electrodes, said envelope being disposed about a longitudinal axis and including two dielectric shells having adjacent ends hermetically sealed to a metallic annulus and remote ends hermetically sealed to said metallic end caps, an expansible conductive support structure within each end of the envelope integrally mounted on the associated end cap and extending into the envelope, an assembly of fixed condenser plates mounted in the envelope, a first assembly of mobile condenser plates interleaved with said fixed plates and integrally mounted on the inner end of one of said expansible support structures, a second assembly of at least one mobile condenser plate integrally mounted on the other said expansible support structure and extending into the envelope toward said first assembly, a mobile cylindrical conductor integrally mounted for movement with said first assembly of mobile condenser plates and inductively related to said second condenser plate assembly, and means external the envelope and operatively supported thereon for moving each expansible structure.

12. The combination according to claim 11, in which said metallic annulus comprises a shield plate having a radially inwardly extending mounting portion and a radially outwardly extending shield portion.

13. The combination according to claim 12, in which the assembly of fixed condenser plates is integrally mounted on said radially inwardly extending mounting portion on one side thereof.

14. The combination according to claim 12, in which said assemblies of fixed and first mobile condenser plates are positioned on one side of said inwardly extending mounting portion, said second mobile condenser plate assembly is positioned on the other side thereof, and said mobile cylindrical conductor is integrally mounted on said first mobile assembly and extends through the inwardly extending mounting portion to adjacent said second condenser plate assembly.

15. The combination according to claim 12, in which a cylindrical shield is integrally united at one end to the radially inwardly extending mounting portion of the shield plate and concentrically surrounds said second condenser plate assembly and a portion of said mobile cylindrical conductor.

References Cited in the file of this patent

UNITED STATES PATENTS

| | | |
|---|---|---|
| 2,466,298 | Baltensperger | Apr. 5, 1949 |
| 2,601,678 | Beatty | June 24, 1952 |
| 2,740,077 | Clarke | Mar. 27, 1956 |